US010542317B2

(12) United States Patent
Wessel (10) Patent No.: US 10,542,317 B2
(45) Date of Patent: Jan. 21, 2020

(54) TWO-WAY TELEVISION ENABLED THERAPEUTIC COMMUNICATION SYSTEMS AND METHODS

(71) Applicant: First Layer Health L.L.C., Minneapolis, MN (US)

(72) Inventor: Paul Wessel, Delano, MN (US)

(73) Assignee: FIRST LAYER HEALTH L.L.C., Delano, MN (US)

(*) Notice: Subject to any disclaimer, the term of this patent is extended or adjusted under 35 U.S.C. 154(b) by 0 days.

(21) Appl. No.: 15/882,757

(22) Filed: Jan. 29, 2018

(65) Prior Publication Data

US 2018/0302676 A1 Oct. 18, 2018

Related U.S. Application Data (63) Continuation of application No. 14/837,526, filed on Aug. 27, 2015, now Pat. No. 9,883,240, which is a continuation-in-part of application No. 14/478,209, filed on Sep. 5, 2014.

(51) Int. Cl.
*H04N 21/24* (2011.01)
*H04N 21/4627* (2011.01)
(Continued)

(52) U.S. Cl.
CPC ....... *H04N 21/4627* (2013.01); *G06F 21/606* (2013.01); *H04N 21/2541* (2013.01);
(Continued)

(58) Field of Classification Search
None
See application file for complete search history.

(56) References Cited

U.S. PATENT DOCUMENTS 7,185,282 B1 2/2007 Naidoo et al.
2002/0129368 A1* 9/2002 Schlack .............. G06Q 30/02
725/46

(Continued)

OTHER PUBLICATIONS

Spinsanta et al., "Remote Health Monitoring for Elderly Through Interactive Television, BioMedical Engineering OnLine 2012," 11:54, http://www.biomedical-engineering-online.com/content/11/1/54, 1-18, Aug. 21, 2012.

(Continued)

*Primary Examiner* — Cai Y Chen
(74) *Attorney, Agent, or Firm* — Patterson Thuente Pedersen, P.A.

(57) ABSTRACT

A communication method and system for providing a secure communication pathway between a user and a third-party is described. The system uses a telecommunications provider which has a controller for distributing and controlling electronic communications between a database, a translation server, a third-party provider of content and public identification information (PII), and at least one television of a user. The at least one television has a set-top box (STB) and a remote control. The STB has a unique electronic identifier (STB-ID). The STB communicates with the controller and the at least one television utilizing the STB-ID to ensure secure communications between the user, the telecommunications provider and the third-party.

10 Claims, 5 Drawing Sheets

(51) Int. Cl.
    *H04N 21/426*     (2011.01)
    *H04N 21/422*     (2011.01)
    *H04N 21/4788*     (2011.01)
    *H04N 21/254*     (2011.01)
    *G06F 21/60*     (2013.01)
    *H04L 12/58*     (2006.01)

(52) U.S. Cl.
    CPC .. *H04N 21/42204* (2013.01); *H04N 21/42684* (2013.01); *H04N 21/4788* (2013.01); *G06F 2221/2115* (2013.01); *H04L 51/04* (2013.01)

(56) References Cited

U.S. PATENT DOCUMENTS

| | | |
|---|---|---|
| 2010/0153487 A1 | 6/2010 | Greven et al. |
| 2013/0125158 A1* | 5/2013 | Brown ................. A61B 5/0002 725/14 |
| 2016/0073165 A1 | 3/2016 | Wessel |
| 2017/0195739 A1 | 7/2017 | Wessel |

OTHER PUBLICATIONS

Newman, "Jewish Home Lifecare Named Innovator of the Year," McKnights, Haymarket Media, Inc., http://www.mcknights.com/jewish-home-lifecare-named-innovator-of-the-year/article/374286/, Sep. 30, 2014.

Application and File history for U.S. Appl. No. 14/478,209, filed Sep. 5, 2014. Inventors: Wessel.

Application and File history for U.S. Appl. No. 14/837,526, filed Aug. 27, 2016. Inventors: Wessel.

Application and File history for U.S. Appl. No. 15/369,147, filed Dec. 5, 2016. Inventors: Wessel.

\* cited by examiner

TWO-WAY TELEVISION ENABLED THERAPEUTIC COMMUNICATION SYSTEMS AND METHODS

CROSS-REFERENCE TO RELATED APPLICATIONS

This application claims the benefit of and is a continuation-in-part of pending U.S. patent application Ser. No. 14/478,209, filed Sep. 5, 2014, the entire content of which is hereby incorporated herein by reference.

BACKGROUND AND SUMMARY

It is well recognized that the need to provide home health services and communications options to an aging population is a matter of growing concern in the United States and elsewhere. Many technological based solutions have been proposed in order to aid in providing these services. Ironically however, the target groups that these solutions are directed to are often the most resistant to employing or even allowing into their homes these "hi-tech" proposals.

For example, the most common method of providing technology based distance care is generally referred to as home health monitoring. Typically, home health monitoring systems include a number of sensors and small computing devices, installed throughout a home that measure and report different activity levels of an individual. Most of these home health monitoring systems have been built on a wireless platform; requiring the resident to purchase and maintain an Internet broadband connection. The current broadband adoption rate of people over 70 years of age is less than 25% however, while the adoption rate of digital broadcast, cable or satellite television is nearly 100% within this same cohort; clearly indicating a technology disconnect with Internet-based devices and systems and preference for those technologies, such as a television set or monitor, with which they are more accustomed. For a more detailed discussion of this quandary, and some possible solutions, see U.S. patent application Ser. No. 14/478,209 and entitled Television Enabled Therapeutic Communication Systems and Methods, filed Sep. 5, 2014; the entire contents of which are incorporated herein by reference.

In addition to requiring negatively perceived new technology, most home health monitoring systems are precisely what their name implies: merely monitoring systems which monitor the rough location and perhaps some key health characteristics of a subscriber (e.g. medallions with sensors which send a signal notifying a service that a user has fallen, bracelets which monitor pulse and/or blood pressure and periodically report readings to a database, etc.). They are effectively crude, one-way, communications devices sending a signal or data set from the monitoring device to the monitoring service (or database). In specific circumstances such monitoring systems may crudely be considered two-way communications systems, such as when a triggering event occurs and the third party monitoring company responds thereto.

With the exception of the system mentioned in U.S. patent application Ser. No. 14/478,209 referenced above however, none of the current monitoring systems or devices provide true multi-path communications which allow the monitoring provider as well third party care givers (friends, family, physicians, pharmacy, etc.) the capability to communicate with a patient/user of the system. The present application seeks to build upon systems such as are described in U.S. patent application Ser. No. 14/478,209, and provide additional systems and methods that will provide a user with the capacity to more fully communicate and interact with third-parties who may be users of the system or outside of the system. Aspects of the present invention will utilize a user's television and its associated remote control via the television's cable set-top box (STB) and a telecommunications provider's (Telecom) services provided thereto to allow the user to interact with third parties.

The desired two-way interactivity of the present system is made possible in part by taking advantage of the controlling software/hardware system that are contained within the electronic ecosystem of the Telecom and known as middleware. Such middleware has traditionally been used by the Telecoms for distributing and billing for digital content that has been sent to a pay television viewer.

The vast majority of known middleware communications are unidirectional-messages (billing reminders, etc.) and/or content sent to the television consumer; although it is recognized that message construction could contain an aspect that would require the television viewer to respond in a particular message through some type of manual activation of the television remote control. An example of this type of system is shown in PRIOR ART FIG. 1.

Figure 1:
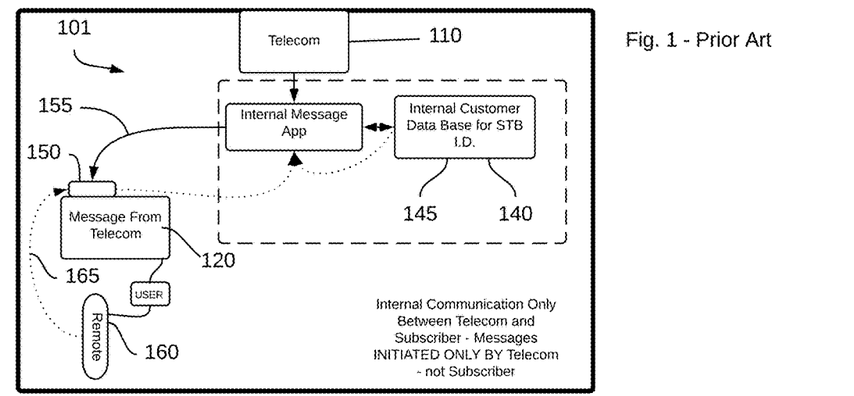
FIG. 1—Shows a conceptual diagram of a PRIOR ART communications system

As shown in PRIOR ART FIG. 1 the system 101, includes a Telecom 110 that provides to a subscriber's/user's television 120 a service for messaging or delivering content represented by controller or middleware application 130. The application 130 is in communication with a database of STB-IDs 140 such that when content is to be sent to a user the application 130 communicates with the database 140 to properly associate the desired/requested content with the proper STB-ID 145. The desired content and STB-ID data stream 155 is directed to the STB 150 of the corresponding television 120. The internal software of the end user's STB verifies the correct STB-ID of the data stream 155. The end user may also manually acknowledge receipt of the data stream 155 by a "yes/no" or "accept/deny" function 165 via the television remote control 160. Once the data stream 155 is verified by the STB 150 and/or accepted by the appropriate input via the remote control 160 (which is/are acknowledged by the application 130), the data stream is converted into a displayable signal and displayed on the television 120.

The present application presents a new system of allowing secure access and utilization of a Telecom's closed messaging system as described above by including a translation function that sends personal public facing information data sets into the Telecom's subscriber database to identify a specific designated STB to which a third-party message (via text or other medium) is to be sent. When the specific set top box has been identified from the specified personal publically available information, the STB identification (STB-ID) is copied and appended to the third-party message so that message deliver is conducted through the existing middleware ecosystem.

Thus, a user who is a subscriber to such a system is provided, not only with the potential services of the Telecom such as internet access, paid television content, cellular communications network, etc. but also the ability to have third-parties outside the Telecom's closed ecosystem send and receive communications with the user; all via interaction with the user's television and its remote control, and without the need for extra negatively perceived "hi-tech" hardware or services. With such a system in place, a user may then be able to opt in to a variety of services such as the aforementioned home health monitoring, customized audio and video programing, reminder services (e.g. "Have you taken your medicine today?"), etc. all via the television medium. Such a system is secure (via the requisite STB-ID) and HIPAA compliant.

These and other embodiments that characterize the disclosure are pointed out with particularity in the claims annexed hereto and forming a part hereof. However, for further understanding of the disclosure reference can be made to the drawings which form a further part hereof and the accompanying descriptive matter, in which there is illustrated and described embodiments of the disclosure.

DESCRIPTION OF THE DRAWINGS

A detailed description of the disclosure is hereafter described with specific reference being made to the drawings.

A detailed description of the disclosure is hereafter described with specific reference being made to the drawings.

DETAILED DESCRIPTION

While this disclosure may be embodied in many different forms, there are described in detail herein specific embodiments of the disclosure. This description is an exemplification of the principles of the disclosure and is not intended to limit the disclosure to the particular embodiments illustrated.

For the purposes of this disclosure, like reference numerals in the figures shall refer to like features unless otherwise indicated.

As mentioned, closed systems exist for providing internal communication between a Telecom and subscriber television(s) such as shown in PRIOR ART FIG. 1, and discussed above.

In at least some embodiments, systems and methods of the present application seek to open these otherwise closed systems to third-parties who seek to communicate with television subscribers via the Telecom's middleware. A first example of such a system 10 is depicted in FIGS. 2-3.

Figure 2:
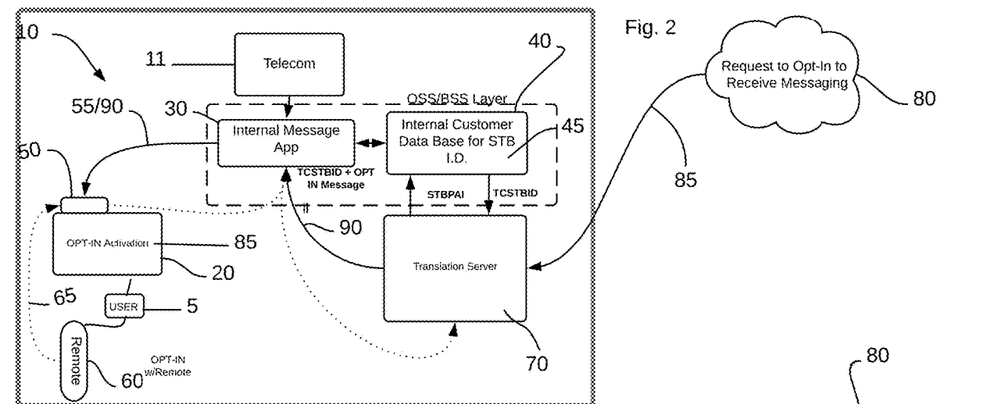
FIG. 2—Shows a conceptual diagram of an embodiment of a communication system described herein.
Figure 3:
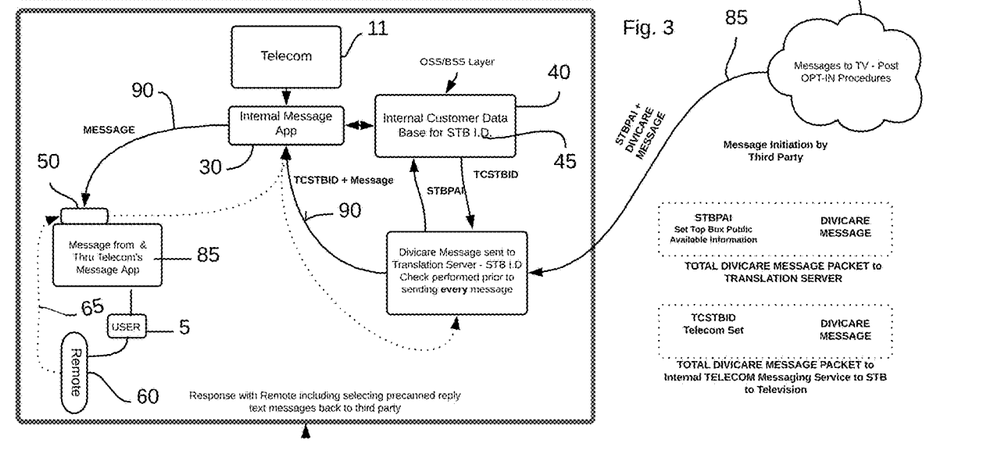
FIG. 3—Shows a conceptual diagram of an embodiment of a communication system described herein.

In a set-up similar to that shown and described in PRIOR ART FIG. 1, the present system 10, as shown in FIGS. 2-3 includes a Telecom 11 which has provided to a subscriber's/user's television 20 a controller for messaging or delivering content represented by controller 30. The system must include a method of identifying the specific subscriber to send an OPT-IN Request to, which can include using specific user registration information plus a Telecom customer number as search parameters to locate a specific STB-ID. The controller 30 is in communication with a database 40, which contains copies of STB-IDs such that when content is to be sent to a user 5, the controller 30 communicates with the database 40 to properly associate the desired/requested content with the proper STB-ID 45. STB-ID 45 is an electronic address such as an IP address or other designator unique to the specific STB 50. The combined content and STB-ID, collectively depicted as data stream 55, is directed to the STB 50 of the corresponding television 20. The internal hardware and/or software of the end user's STB verifies the correct STB-ID of the data stream 55. The end user may also manually acknowledge receipt of the data stream 55 by a "yes/no" or "accept/deny" function 65 via the television remote control 60. Once the data stream 55 is verified by the STB 50 and/or accepted by the appropriate input via the remote control 60 (which is/are acknowledged by the controller 30), the data stream is converted into a displayable signal and displayed on the television 20.

In addition, system 10 includes a translation server 70 in communication with the database 40 that performs a search using set top box public available information (STBPAI) to locate a corresponding STB. A third-party such as a home healthcare provider (represented by element 80) sends an access request, message or other digital content 85 (e.g. an opt-in request for service, an advertisement, etc.) to the translation server 70. The third-party 80 content 85 will include user registration information (user number, etc.) along with the publicly available Telecom customer number or similar publicly available personal identification information (PII) in the request 85. When the content 85 containing the PII reaches the translation server 70, the translation server uses the PII to locate the STB-ID 45 from the database 40. Once the STB-ID is located, an OPT-IN Message can be sent through an internal message app. Once the STB-ID is located, it is copied and replaces the PII portion of the content 85 and that content now becomes STB-ID+ message content 90. The messaging application within the controller 30 can only look and direct a message to a specific STB-ID because, for example, the telecom 11 could have several subscribers named John Anderson, who might also share other identical pieces of PII. Using the STB-ID to direct content 85 to the correct subscriber/user allows the system 10 to ensure that confidentiality of content 85 is maintained and is HIP AA compliant when necessary.

As indicated, the PII is exchanged with the appropriate STB-ID by the translation server 70 via the database 40, so as to correctly locate the proper STB-ID 45 of the appropriate subscriber's/user's STB 50 and television 20. When the proper STB-ID 45 is located, the translation server 70 sends the combined content (such as an opt-in request, etc.) 85 and STB-ID 45 (as represented by line 90) to the controller 30; which then forwards the combined request and STB-ID 90 to the proper STB 50 as shown. STB 50 then verifies that the STB-ID of the combined request/STB-ID 95 is correct and the request is displayed on the television 20. A subscriber/user viewing the opt-in request displayed on the television can then replay to the request by using the remote control 60 to "opt-in" or "opt-out". The response function 65 is communicated back to the controller 30 and eventually back to the third-party 80.

Figure 4:
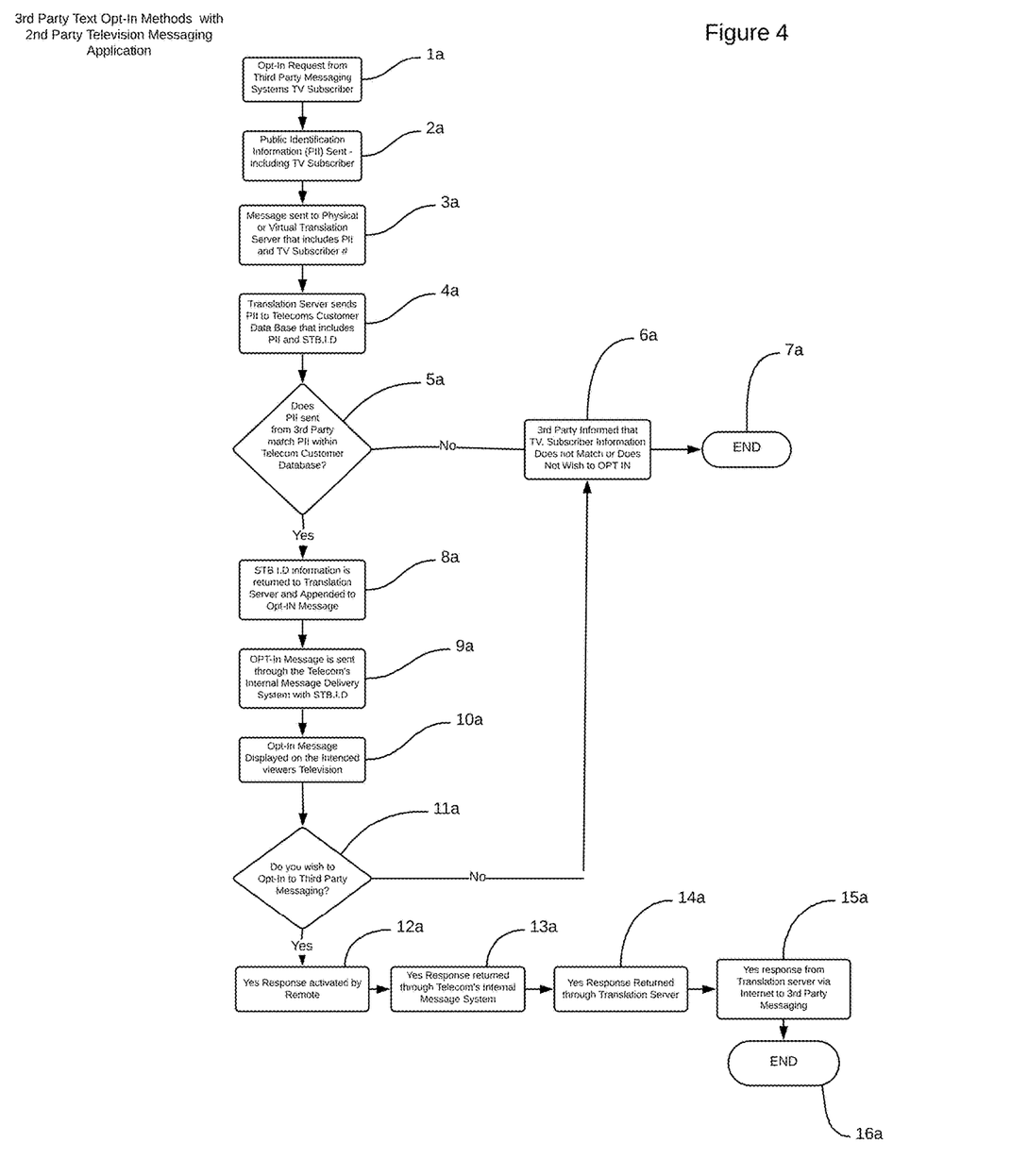
FIG. 4—Is a flow chart of possible communication pathways of the embodiment shown in FIG. 2.
Figure 5:
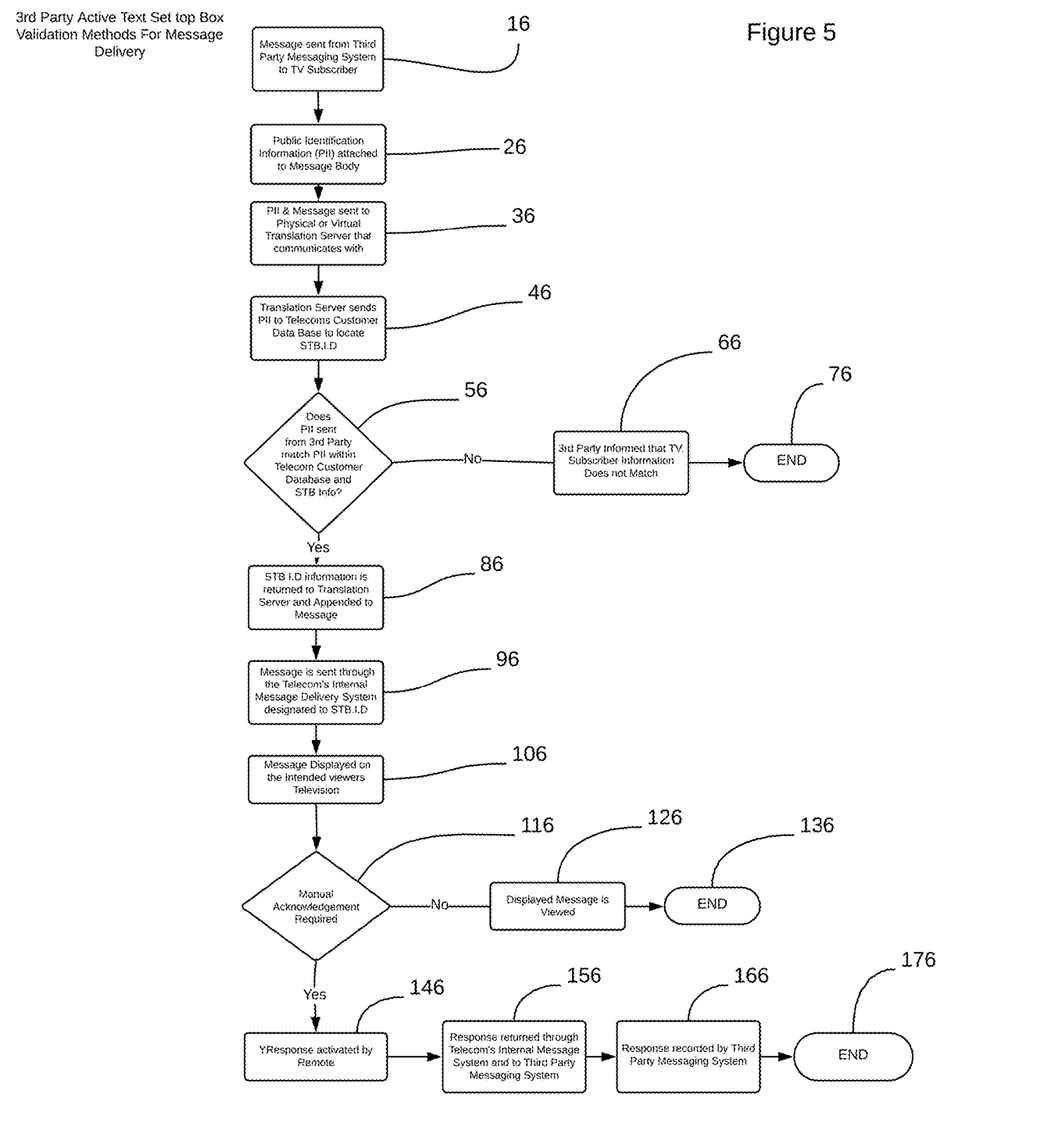
FIG. 5—Is a flow chart of possible communication pathways of the embodiment shown in FIG. 4.

As shown in FIGS. 4 and 5, once a subscriber/user has opted in to the third-party 80 request for service, subsequent messages/content is sent to the subscriber's/user's television 20 in the same manner and with similar degrees of verification of STB-ID 45 for every communication 85 sent from the third-party 80. That is to say: every message or specific program content (such as for example: a text message, an audio/video program, an advertisement, a voice reminder, etc.) provided by the third-party 80 and sent to the television 20 requires STB-ID verification from the STB 50 and the combined data stream 90 of third-party content and STB-ID and/or user response/acknowledgement via remote control 60 in the manner previously described.

The steps for the initial "opt in" process is depicted in FIG. 4, which shows an embodiment of the manner in which the system allows a third-party provider 80 to communicate with the middleware controller 30 of the telecom 11 and eventually send data or programing 55 to the user/subscriber television 20 such as in the manner shown and described in FIG. 2.

The first step of the communication process as shown in FIG. 4 is to send a message 85 from the third party provider 80 to the telecom controller 30 with PII information with a "YES Opt IN" flag attached as shown in Block 1a. In Block 2a the PII information and OPT IN message is sent to a translation server 70, who upon electronic receipt of PII and Opt IN message information electronically sends a QUERY to the telecom's subscriber database 40 where STB-IDs are located as shown in Blocks 3a & 4a. At Block 5a the QUERY function from the translation server uses PII information to locate the specific STB-IDs that are associated with the PII. If no association is found between the PII and the STB-ID, the message 85 is returned to the third-party 80 with an indicator that no association has been found as shown in Block 6a. At that point the OPT IN process ends as illustrated in Block 7a.

If there is successful association between the PII and STB-ID as in Block 5a, the STB-ID is appended to the OPT IN messages (collectively element 90 in FIG. 2) and electronically delivered to the associated STB 50 and displayed on the television set as shown in Blocks 8a, 9a and 10a.

As illustrated at Block 11a, the OPT IN display message requires physical acknowledgement by the viewer 5 to allow digital message types to be delivered from third-party 80, through the telecom's network, through a specific STB 50 and displayed onto the television 20. If the subscriber does NOT OPT IN—a similar reply to that illustrated in Block 6a is returned to the third-party 80.

If the viewer 5 accepts to OPT IN he or she electronically acknowledges acceptance through activation of a television remote 60 as shown in Block 12a. Once the OPT IN message has been received through the telecom and back to the third party, the STB-ID (number) is stored for future message delivery to the television set 20 of the viewer 5 as shown in Blocks 13a, 14a, and 15a. The opt-in process and delivery of content ends at Block 16a.

FIG. 5 shows an embodiment of the manner in which the system 10 allows a third-party provider 80 to regularly communicate and check with the middleware controller 30 of the telecom 10 and to insure valid message delivery of sent data or programing to the user/subscriber television such as in the manner shown and described in FIG. 3

After OPT IN process has occurred as illustrated in FIGS. 2 and 4, data or programming to the user/subscriber television 20 can now regularly occur. Given the different set top box options that are presently available to user/subscriber television, a method of verifying active set top box identifications associated with the user/subscriber television is warranted. As shown in FIG. 5, message composition and delivery from the third-party provider 80 is shown in Blocks 1b, 2b and 3b. It is important to note that message composition contains PII information with the body of the message 85. Attaching the PII information to every message type enables the translation server 70, as illustrated in Block 4b to perform a "check" within the telecom's user/subscriber database 40 to insure the STB associated with the PII is still in an active state and capable of receiving data/programming. In Block 5b the translation server 70 issues a QUERY to the Telecoms subscriber/user television database 40 using the PII. If the PII information cannot be associated with any activated STB 50 contained within the subscriber/user television database 40, the third-party 80 is informed that no association exists as show in Block 6b. At this point the message delivery process ends as shown in Block 7b.

If the PII contained within the QUERY by the translation server 70 to the user/subscriber television database 40 can be associated with an active STB 50, the active STB-ID number is appended to the message (collectively element 90 as shown in FIGS. 2 and 3) and sent through the telecom's message delivery system, to the active STB 50 associated with the PII and displayed on the television 20 of the user/subscriber 5. These steps are illustrated in Blocks 8b, 9b, and 10b.

As shown in Block 11b, if the message 85 displayed on the user/subscriber television set 20 is for informational purposes only, requiring no physical acknowledgement from the user/subscriber 5, the message is simply displayed for a period of time and then disappears as shown in Blocks 12b. Delivery of the message 85 is then complete and the process ends at Block 13b.

If manual acknowledgement of message delivery is required by the user/subscriber 5, a television remote 60 is used to respond to the action required by the message 85, such as is shown in Block 14b. Upon manual activation (illustrated by element 65 in FIGS. 2 and 3) of television remote 60 (or other electronic interface device capable of generating a signal similar to a television remote), the electronic signal 65 is captured by the system and returned through the television network and arriving at the third-party 80 where responses are recorded as illustrated, in Blocks 15b and 16b. Upon completion of the message delivery and acknowledgment by the user 5 and third-party 80, the process ends at Block 17b.

Figure 6:
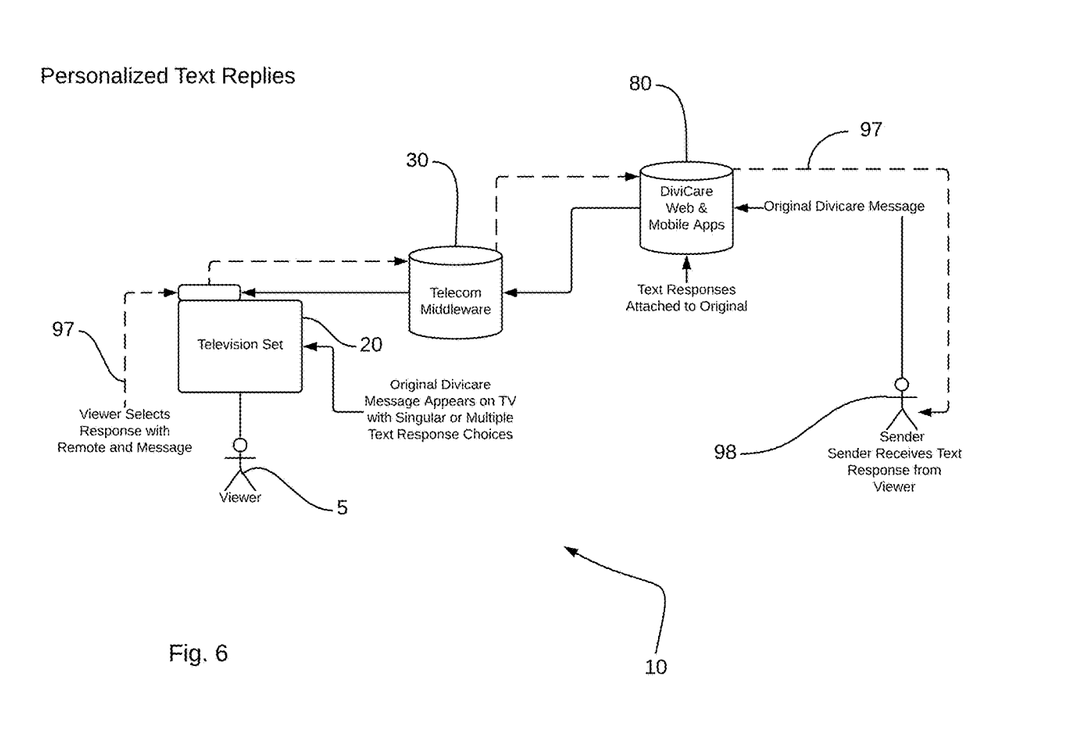
FIG. 6—Shows a conceptual diagram of an embodiment of a communication system described herein.

In some embodiments, the subscriber's/user's STB 50 may be provided with a database that contains a plurality of pre-programmed messages, which may be in the form of text, audio recordings, images and/or video content that the subscriber/user may send back through the system 10 via remote control 60, such as in the manner depicted in FIG. 6. The STB 50 may have a dedicated internal database of preprogrammed messages and/or the third-party 80 may provide them to the STB 50 by authorized updates or by sending a selection of predetermined responses appropriate to a message 90 within the data stream 95 of that same message.

In addition, or alternatively, the subscriber/user 5 may create custom text messages using the alpha-numeric keypad of the remote control 60. These subscriber/user 5 originated messages 97 may be sent by the subscriber/user in response to content received by the television 20 from the third-party 80 or independently therefrom. For example, a message 90 sent to television 20 from the third-party 80 may be a simple text message a text, asking how the subscriber/user is feeling, or has the subscriber/user taken a medication? The subscriber/user, as a form of acknowledgment or receipt of the message 90 may respond using the remote control 60 with a preselected text response 65 of "I'm fine" or "Yes, I took my medicine", etc. using the remote control 60 to select from a menu of possible responses or simply type in the response manually.

The subscriber/user 5 may also utilize their television remote control 60 to send messages 65 via the interface of the remote control 60 and the television 20 to the third-party 80 without first receiving a message 90 or content 95. For example, the subscriber/user may use remote 60 to request a service, update contact information, report problems, etc.

In some embodiments system 10 is configured as an open or multi-path communication system, wherein the subscriber/user of the system 10 is provided access to individuals or entities (fourth-party or parties) 98 that are outside of the system shown, but who are nevertheless electronically connected to the system via telecom 11 or applications provided by the telecom 11 or third-party 80. Thus, the subscriber/user may use the television 20 and its remote control 60 to contact and communicate with cell phone users, internet users, etc.—anyone or anything to which the subscriber/user knows its electronic identification (e.g. phone number, IP address, etc.).

As discussed above, embodiments of the present application are of particular use for home healthcare providers as well as subscribers/users of such systems for individual activity identification methods through digital content utilization. With such systems 10, the third-party 80 is a health care monitoring service or similar entity. While such an entity may seek to provide a subscriber/user with the various communications options mentioned above, aspects of the present invention are also useful for providing more traditional monitoring services as well as the capability of analyzing the interactions of a subscriber/user with the system 10 so as to develop analytics that may be used to improve the health and wellbeing of the subscriber/user.

Figure 7:
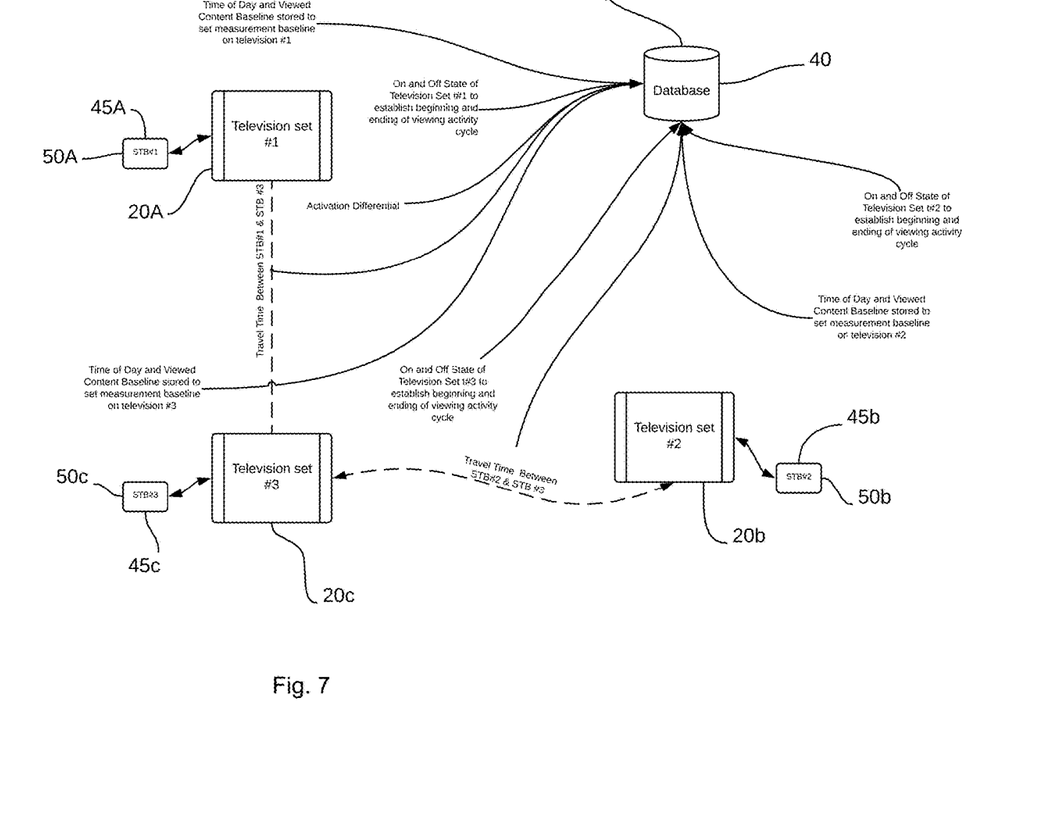
FIG. 7—Shows a conceptual diagram of an embodiment of a communication system described herein.

For example, in an embodiment such as is shown in FIG. 7 the system 10 includes three televisions 20a, 20b, 20c which are integrated and connected to the system 10 in the same manner as a single television 20, such as has been shown and described above. Each television 20a, 20b, 20c and its associated STB 50a, 50b, 50c, is in communication with the database 40. As each television 20a, 20b, 20c and their associated STB 50a, 50b and 50c are connected to the controller 30 and database 40, the various interactions that a subscriber/user has with each television 20a, 20b, 20c (via unique STB-IDs 45a, 45b, 45c of the respective STBs) may be monitored by controller and recorded within database 40. In this way, the various STB-ID acknowledgements, the type of programming requests, the on/off status of the televisions, the physical attributes of the televisions (volume, brightness, etc.), the length of time each television is on/off, the intervals between use of a given television, and/or other aspects of the subscriber's/user's interactions with the system 10 may be collected and analyzed. In this way patterns of behavior can be established and notices given to the subscriber/user and/or healthcare providers of variations from those established patterns.

Figure 7A:
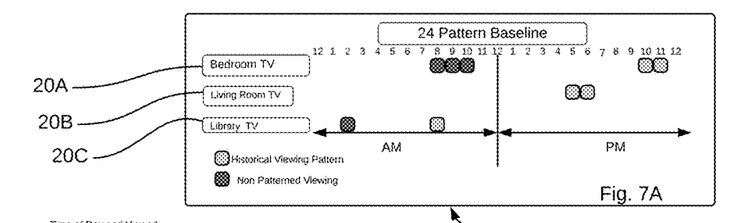
FIG. 7a—Shows an example graph comparing historical or baseline activity and deviations therefrom.

FIG. 7a for example is a shows a chart that depicts the theoretical viewing habits of a subscriber/user over a period of time, with the historical or established periods that a given television 20a, 20b and 20c are on, and when depicted in lighter boxes and deviations from this established viewing pattern shown in dark boxes.

The establishment of viewing patterns and interactions with the system 10, and more importantly the determination of deviations from those normative patterns, may be indicative of health problems that the subscriber/user may be afflicted by. For example, the additional morning television viewings depicted in FIG. 7a relative to the established pattern may suggest sleeping difficulties or other possible conditions that a subscriber/user and/or his or her health care provider may want to be aware of. Depending on the nature of the deviation from established patterns the application 40 may include a routine to notify the user/subscriber of the deviation or even to contact the healthcare provider or emergency service.

In some embodiments the system 10 can be linked to devices in addition to a television 20, such as for example motion detectors, various appliances (e.g. multiple televisions, computers, refrigerators, etc.), security systems, etc. By monitoring these devices and using data collected there from, additional behavior patterns of the subscriber/user may be established and deviations from established behaviors more readily detected and understood in a broader context.

The above disclosure is intended to be illustrative and not exhaustive. This description will suggest many variations and alternatives to one of ordinary skill in this art. The various elements shown in the individual figures and described above may be combined or modified for combination as desired. All these alternatives and variations are intended to be included within the scope of the claims where the term "comprising" means "including, but not limited to".

The invention claimed is:

1. A method of monitoring activity and behavior of a user within a home of the user, comprising:
   creating and identifying a unique electronic identifier for each of a plurality of set top boxes or televisions in the home of the user, each set top box being associated with a different television having a different physical location within the home of the user and configured to receive content from a telecommunications provider and display the content on the corresponding television;
   monitoring user interactions with the plurality of set top boxes and corresponding televisions in the home of the user based on the unique electronic identifier for each of the plurality of set top boxes or televisions;
   recording the user interactions in a database;
   analyzing the user interactions to establish one or more activity or behavioral patterns of the user;
   comparing subsequent user interactions with the plurality of set top boxes to the one or more activity or behavioral patterns to determine deviations from the one or more activity or behavioral patterns; and
   determining that the deviations from the one or more activity or behavioral patterns based on the user interactions with the plurality of set top boxes are indicative of a change in a health condition of the user.

2. The method of claim 1, further comprising notifying the user based on the comparison when deviations from the one or more activity or behavioral patterns are detected.

3. The method of claim 1, further comprising monitoring user activity or behavior based on one or more additional electronic devices in the home of the user in operable combination or electronic communication with the televisions and set top boxes.

4. The method of claim 3, wherein establishing one or more activity or behavioral patterns of the user further includes analyzing data collected from the one or more additional electronic devices.

5. The method of claim 3, wherein the one or more additional electronic devices are selected from the set consisting of: one or more motion detectors, a security system, one or more computers and one or more home appliances.

6. The method of claim 1, wherein the user interactions with the plurality of set top boxes and corresponding televisions include times when each set top box in operable combination with each television set is on and times when each set top box is off.

7. The method of claim 1, wherein the user interactions with the plurality of set top boxes and corresponding televisions include an identification of the content viewed on the corresponding televisions.

8. The method of claim 1, wherein the user interactions with the plurality of set top boxes and corresponding televisions include physical attributes of the corresponding televisions when content is viewed.

9. The method of claim 8, wherein the physical attributes of the corresponding televisions include a brightness and/or a volume.

10. The method of claim 1, further comprising notifying a healthcare provider or others based on the comparison when deviations from the one or more activity or behavioral patterns are detected.

* * * * *